Patented Apr. 17, 1951

2,549,425

UNITED STATES PATENT OFFICE 2,549,425

CONDENSATION OF ALKYLATED NAPHTHALENE WITH A SULFUR OXYHALIDE IN PRESENCE OF FRIEDEL-CRAFTS CATALYST AND MINERAL OIL COMPOSITIONS CONTAINING SAME

Edward P. Cashman, Bayonne, N. J., and Eugene Lieber, Chicago, Ill., assignors to Standard Oil Development Company, a corporation of Delaware No Drawing. Application December 31, 1947, Serial No. 795,122

16 Claims. (Cl. 252—48.2)

This invention relates to novel chemical products and to methods of preparing the same, and relates more particularly to the preparation of chemical compositions having improved wax modifying properties, particularly for use as pour point depressants for waxy mineral lubricating oils and to lubricants containing such compositions.

It is known that wax modifying agents may be prepared by condensing relatively long chain paraffinic materials such as chlorinated paraffin wax and olefins corresponding thereto with aromatic hydrocarbons such as benzene, toluene, naphthalene, anthracene, phenanthrene and the like and such compounds have been described in U. S. Patent 1,815,022.

Such compounds have found considerable use as addition agents to waxy mineral oils for the purpose of modifying the form in which the wax crystallizes out from the oil and lowering the temperature at which the oil ceases to be pourable, but they suffer from the disadvantage that the lowered pour point of the oils containing them is not stable and after long storage in temperatures fluctuating over short ranges in the region of the pour point, as on storage in wintry conditions, the pour point of the oil or the temperature at which the oil ceases to pour gradually rises until it ultimately approaches that of the oil without the addition agent.

This is believed to be due to the mechanism by which the additive operates to reduce the pour point and the variations in the solubilities at low temperature of the oil.

It is believed that the pour point depressant compounds deposit on the surface of the wax crystals as they are formed and thus prevent the wax crystals from agglomerating and forming a solid structure which prevents the oil from pouring and that on increasing the temperature slightly the said deposited wax is redissolved in the oils before the temperature rises sufficiently to redissolve the pour point depressant compound and on slight reduction of the temperature again the wax is able to crystallize and the crystals are able to grow at least partly before the pour point depressant is redeposited on them and so the pour point of the oil is raised.

It has now been found that the stability of the low pour point of oils containing such alkylated aromatic compounds can be very much improved by further reacting the compounds with a sulfur oxyhalide.

The present invention accordingly comprises a method of producing improved wax modifying agents suitable for use as addition agents to lubricating oils comprising reacting an alkylated aromatic compound produced, for example, by condensing an aromatic hydrocarbon with a chlorinated wax compound with a sulfur oxyhalide such as sulfuryl chloride ($SO_2Cl_2$) or thionyl chloride ($SOCl_2$) and lubricants containing such compounds.

The alkylated aromatic compounds which may be used according to the invention are aromatic hydrocarbons containing long chain aliphatic groupings attached to the aromatic nucleus which may be formed by the processes described in U. S. Patent Specification 1,815,022 by condensing an aromatic hydrocarbon such as naphthalene, benzene, toluene, anthracene, phenanthrene and the like with halogenated long chain hydrocarbons such as, for example, chlorinated waxes with a long chain olefine, preferably a compound containing more than 8 carbon atoms in the molecule. The condensation of such materials has generally been carried out in the presence of a Friedel-Crafts catalyst such as aluminum chloride, zinc chloride, boron fluoride, etc., preferably in the presence of an inert solvent such as a refined kerosene, tetrachlorothane, dichlorbenzene, etc., and at a temperature ranging from about room temperature to about 300° F., preferably not exceeding about 200° F., and generally using proportions of about 2 to 5 moles of the chlorwax type of constituent to 1 mole of the aromatic constituent. For example, about 10 to 20 parts by weight of naphthalene may be condensed with 100 parts by weight of chlorinated paraffin wax having about 10 to 20% chlorine, preferably about 12 to 15% chlorine, in the presence of about 100 to 300 parts by weight of a refined kerosene solvent, and using about 1 to 3% by weight of aluminum chloride catalyst based on the weight of the chlorinated paraffin wax, starting the reaction at room temperature, and gradually raising the temperature of the reaction mixture to a final temperature of about 90° F. for about 5 hours. Residual catalyst may then be hydrolyzed and removed by washing with water, alcohol, aqueous caustic soda or dilute hydrochloric acid, etc., settling and drawing off the resultant sludge, and finally the desired high molecular weight Friedel-Crafts condensation product is recovered from the reaction mass by distillation under reduced pressure such as under vacuum of about 1 to 50 mm. mercury absolute pressure, or by steam distillation, to a temperature of about 600° F. The product thus obtained has an average molecular weight of about 1000.

Examples of the sulfur oxyhalides which may be used to prepare the compounds of the present invention are thionyl chloride ($SOCl_2$) and sulfuryl chloride ($SO_2Cl_2$).

In preparing the compounds of the present invention the sulfur oxyhalide, for example, thionyl chloride, is reacted with the alkylated aromatic compound, for example, a chlorinated wax naphthalene condensation product in the presence of a Friedel-Crafts catalyst, for example, aluminum chloride or boron fluoride, preferably in the presence of an inert solvent such as, for example, dichlorbenzene. It is preferred that the reaction with the sulfur oxyhalide should take place as soon after the formation of the alkylated aromatic compound as possible. According to a preferred method of carrying the invention into effect the aromatic compound, for example, naphthalene, is condensed with a halogenated aliphatic compound, for example, a chlorinated wax, by heating a mixture of naphthalene and the catalyst aluminum chloride in a solvent such as dichlorbenzene and adding the chlorinated wax to the hot mixture slowly over a period of time. When all the chlorinated wax has been added the mixture is diluted with more solvent and a further quantity of catalyst aluminum chloride is added, after which the thionyl chloride is added slowly over a period of time. The mixture is then maintained hot for a further period of time, after which it is cooled and treated with an aqueous alcohol to destroy the catalyst. The aqueous sludge layer is then removed and the residue steam distilled up to 600° C., leaving the bottoms as the product.

These compounds, when added to lubricating oils, are found to have very good pour point depressant properties and to be much more stable with respect to these properties when subject to short range fluctuations of temperature in the region of the pour point than the corresponding alkylated aromatic hydrocarbons formerly used. Two methods of carrying the invention into effect are shown, by way of example only, in the following examples.

EXAMPLE 1

35 grams of naphthalene and 5.0 grams of aluminum chloride were suspended in 45 cubic centimeters of o-dichlor benzene and the mixture was heated to 125° F. 250 grams of chlorinated paraffin wax containing 14.3% chlorine were added slowly over a period of 30 minutes with agitation.

After the addition of the wax a further 200 ccs. of dichlorbenzene and 10 grams of aluminum chloride were added to the mixture, followed by 33 grams of thionyl chloride ($SOCl_2$) added over a period of 15 minutes. The mixture was then kept at 125° F. for 30 minutes, after which it was cooled to 100° F. and diluted with 500 ccs. of solvent and the catalyst was destroyed by treatment with aqueous alcohol. The sludge containing the catalyst was removed and the residue was steam distilled to 600° C., yielding 290 grams of a viscous green oil as bottoms.

Various amounts of this oil were blended with a standard wax containing lubricating oil and the pour point of each blend was determined by the method prescribed by the American Society for Testing Materials and the results tabulated as under.

| Amount of Compound Added to Oil | Pour Point, °F. |
|---|---|
| 0 (original oil) | +30 |
| 0.01845% | −5 |
| 0.025 | −5 |
| 0.05 | −15 |
| 0.10 | −20 |
| 0.125 | −20 |

Further blends were made up from a standard test oil and similar proportions of the compounds of the present invention and compounds commonly employed at the present time as pour point depressants. The mixtures where then stored for a considerable time under conditions of temperature fluctuating between +30 and −13° F. and regular observations of the pour properties of the blends and the temperatures were made.

The blends were made up by adding to the test oil 0.5% to 1% of a solution containing 11% of the active ingredient of the present invention in the same standard oil solvent and 0.5 to 1% of the commercial products A and B which are believed to be solutions in oil containing approximately the same concentration of active ingredient. The observations of the fluidity were then tabulated and those made at temperatures between −13 and +30° F. were selected and the pour stability calculated as 100 multiplied by the quotient of the number of observations where the oil was fluid divided by the total number of observations between these temperatures and are tabulated below. These are combined figures for the samples containing 0.5% of addition agent and 1.0% of addition agent.

Table I.—For observations between −30 and +13° F.

| Additive Employed | Pour Point Stability Rating |
|---|---|
| A | 64 |
| B | 48 |
| Compound of Present Invention | 86 |

Similar results were also tabulated for observations made between the temperatures +1° F. to −20° F. and are given below.

Table II.—For observations between −20 and +1° F.

| Additive Employed | Pour Point Stability Rating |
|---|---|
| A | 13 |
| B | 52 |
| Compound of Present Invention | 75 |

These results show that the compounds of the present invention have very much better stability as regards the depression of the pour point than the compositions formerly used, particularly in the range most concerned, from +1° F. to −20° F.

EXAMPLE 2

150 grams of an alkylated aromatic hydrocarbon produced by the condensation of chlorinated wax with naphthalene as described in Example 1 were mixed with 150 ccs. of dichlorbenzene in a reactor. 10 gms. of aluminum chloride were then added, followed by 20 gms. of sulfuryl chloride (SO₂Cl₂) in small quantities over a period of 30 minutes. The mixture was then maintained at a temperature of 91° F. for a period of 30 minutes and a further 100 ccs. of o-dichlorbenzene were added and the mixture kept at a temperature of 90° F. for a further 15 minutes. The reaction mixture was then diluted with 1000 ccs. of kerosene and the mixture was treated with aqueous alcohol to destroy the catalyst. The aqueous layer containing the catalyst was removed and the residue was steam distilled to 600° C., leaving a residue of 126 gms. of product.

It will be noted that the proportions of sulfuroxyhalide and condensation product in both Examples 1 and 2 were approximately equimolar.

Varying quantities of this composition were then added to two standard blends of oils and the pour points of the samples were determined by the ASTM method and the results tabulated below.

From these figures the compounds were compared with the corresponding results using the untreated chlorwax-naphthalene still bottoms and the comparison expressed as a blending per cent or the number of parts less of the present compound required to produce the same effect as 100 parts of the untreated compound and the per cent improvement indicating the per cent improvement obtained with the compounds of the present invention as compared with the results obtained using the untreated chlorwax naphthalene body.

| Amount of Additive Added | Pour Point | |
|---|---|---|
| | Oil A | Oil B |
| 0.125% | −20 | −20 |
| 0.100% | −15 | −20 |
| 0.05% | −10 | −15 |
| 0.0375% | −5 | −15 |
| 0.25% | +5 | 0 |
| 0.1845% | +10 | +10 |
| Blending Per Cent | 4.6 | 9.5 |
| Per Cent Improvement | 22.2 | 24.0 |

Per cent improvement over original still bottoms used as starting material.
Per cent improvement indicates amount less required to produce same effect.

We claim:

1. A process for preparing a wax modifying agent comprising reacting substantially equimolar proportions of an oxyhalide of sulfur and an alkylated naphthalene containing more than 8 carbon atoms in the alkyl chain in the presence of a Friedel-Crafts catalyst at a temperature within a range of from room temperature to 300° F.

2. A process for preparing a wax modifying agent comprising reacting substantially equimolar proportions of a thionyl chloride and an alkylated naphthalene containing more than 8 carbon atoms in the alkyl chain in the presence of a Friedel-Crafts catalyst at a temperature within a range of from room temperature to 300° F.

3. A process for preparing a wax modifying agent comprising reacting substantially equimolar proportions of sulfuryl chloride and an alkylated naphthalene containing more than 8 carbon atoms in the alkyl chain in the presence of a Friedel-Crafts catalyst at a temperature within a range of from room temperature to 300° F.

4. A process as claimed in claim 1 wherein the alkylated naphthalene is a compound produced by the condensation of a naphthalene and a halogenated hydrocarbon such as a chlorinated paraffin wax.

5. A process for preparing a wax modifying agent comprising reacting substantially equimolar proportions of the condensation product of naphthalene and a chlorinated paraffin wax and a sulfur oxyhalide in the presence of a Friedel-Crafts catalyst at a temperature within a range of from room temperature to 300° F.

6. A process as claimed in claim 5 wherein the reaction is carried out in the presence of a solvent.

7. A process for preparing a wax modifying agent comprising reacting about 10 to 20 parts by weight of naphthalene with about 100 parts by weight of a chlorinated paraffin wax in the presence of aluminum chloride at a temperature range from about room temperature to about 300° F. and further reacting the product with a substantially equimolar proportion of a sulfur oxyhalide in the presence of a further quantity of aluminum chloride at a temperature range of from about room temperature to about 300° F.

8. A process as claimed in claim 7 wherein the reactions are carried out in the presence of a solvent.

9. A process for preparing a wax modifying agent comprising suspending 35 parts by weight of naphthalene in 45 parts by volume of o-dichlorbenzene, heating the mixture to a temperature of 125° F., adding slowly to the hot mixture 250 parts by weight of a chlorinated paraffin wax containing 14.3% of chlorine over a period of 30 minutes, adding a further 200 parts by volume of o-dichlorbenzene and 10 parts by weight of aluminum chloride, adding 33 parts by weight of thionyl chloride slowly over a period of 15 minutes, maintaining the mixture at a temperature of 125° F. for 30 minutes, cooling the mixture to 100° F., adding 500 parts by volume of a solvent, treating the resultant solution with aqueous alcohol, removing the aqueous layer and sludge, and steam distilling the residue to 600° C. and collecting the residue.

10. A wax modifying agent comprising the product of condensation of substantially equimolar proportions of a sulfur oxyhalide and an alkylated naphthalene containing at least 8 carbon atoms in the alkyl chain said condensation being carried out at a temperature of between room temperature and 300° F. in the presence of a Friedel-Crafts catalyst.

11. A wax modifying agent comprising the product of condensation of substantially equimolar proportions of thionyl chloride and an alkylated naphthalene containing at least 8 carbon atoms in the alkyl chain said condensation being carried out at a temperature of between room temperature and 300° F. in the presence of a Friedel-Crafts catalyst.

12. A wax modifying agent comprising the product of condensation of substantially equimolar proportions of sulfuryl chloride and an alkylated naphthalene containing at least 8 carbon atoms in the alkyl chain said condensation being carried out at a temperature of between room temperature and 300° F. in the presence of a Friedel-Crafts catalyst.

13. A wax modifying agent comprising the product of condensing a sulfur oxyhalide and the product of condensing substantially equimolar proportions of an naphthalene and a chlorinated aliphatic hydrocarbon containing more than 8 carbon atoms in the molecule, both condensations being carried out in the presence of a Friedel-Crafts catalyst at a temperature of between room temperature and 300° F.

14. A lubricant comprising a major proportion of a mineral lubricating oil and from 0.018% to 0.125% of a compound obtained by the condensation of 20 parts by weight of a sulfur oxyhalide with 150 parts by weight of an alkylated naphthalene having an alkyl group containing at least 8 carbon atoms in the alkyl group at a temperature of between room temperature and 300° F. in the presence of Friedel-Crafts catalyst.

15. A lubricant comprising a mineral oil containing a major proportion of a quantity of a compound sufficient to increase the pour stability substantially; said compound being obtained by condensing naphthalene and chlorinated paraffin wax and further condensing the compound with a sulfur oxyhalide at a temperature of between room temperature and 300° F. in the presence of a Friedel-Crafts catalyst, the proportion of condensed naphthalene-wax and said sulfur oxyhalide being approximately equimolar.

16. A lubricant comprising a mineral oil and a major proportion of a quantity of a sulfur oxyhalide derivative of an alkylated naphthalene having an alkyl group containing at least 8 carbon atoms sufficient to increase the pour stability substantially.

EDWARD P. CASHMAN.
EUGENE LIEBER.

REFERENCES CITED

The following references are of record in the file of this patent:

UNITED STATES PATENTS

| Number | Name | Date |
|---|---|---|
| 1,045,139 | Graul | Nov. 26, 1912 |
| 1,183,094 | Mann | May 16, 1916 |
| 1,815,022 | Davis | July 14, 1931 |
| 2,118,214 | Marsh | May 24, 1938 |
| 2,174,289 | Levine | Sept. 26, 1939 |
| 2,244,886 | Lincoln | June 10, 1941 |
| 2,257,969 | Loane | Oct. 7, 1941 |
| 2,364,454 | Lieber et al. | Dec. 5, 1944 |
| 2,422,247 | Lieber et al. | June 17, 1947 |

OTHER REFERENCES

Boeseken: Rec. Trav. Chim., volume 30, pp. 381–388 (1911).

Whitmore: "Organic Chemistry," D. Van Nostrand, Inc., N. Y., page 94 (1942).